No. 862,754.　　　　　　　　　　　　　　　PATENTED AUG. 6, 1907.
C. PLUNKETT.
BROOM TRIMMING MACHINE.
APPLICATION FILED MAR. 23, 1907.
2 SHEETS—SHEET 2.
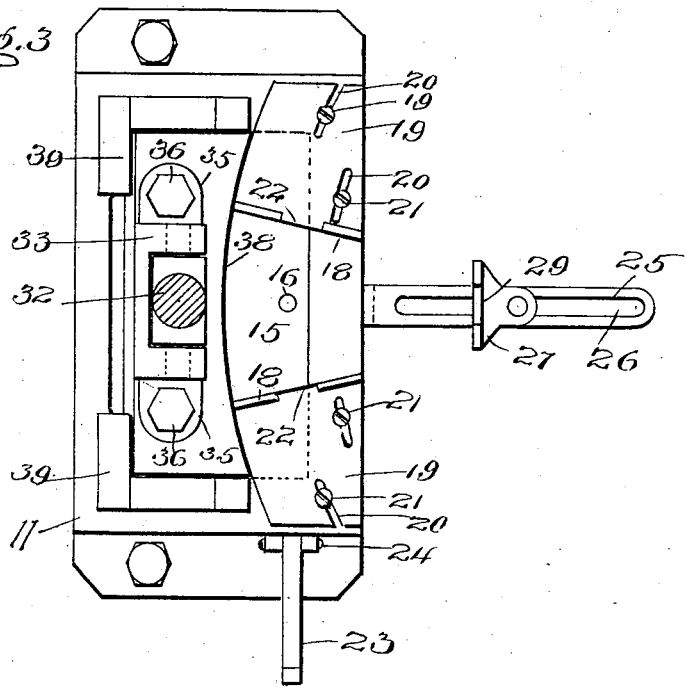
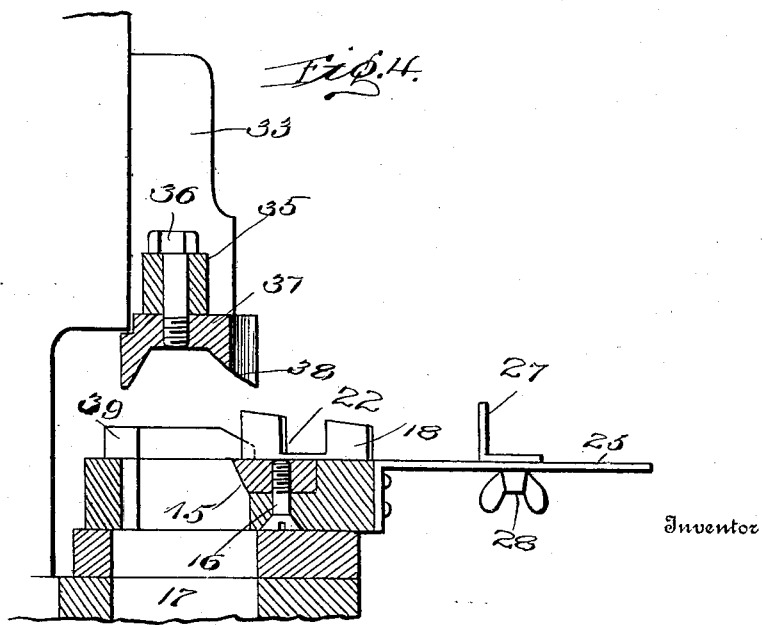

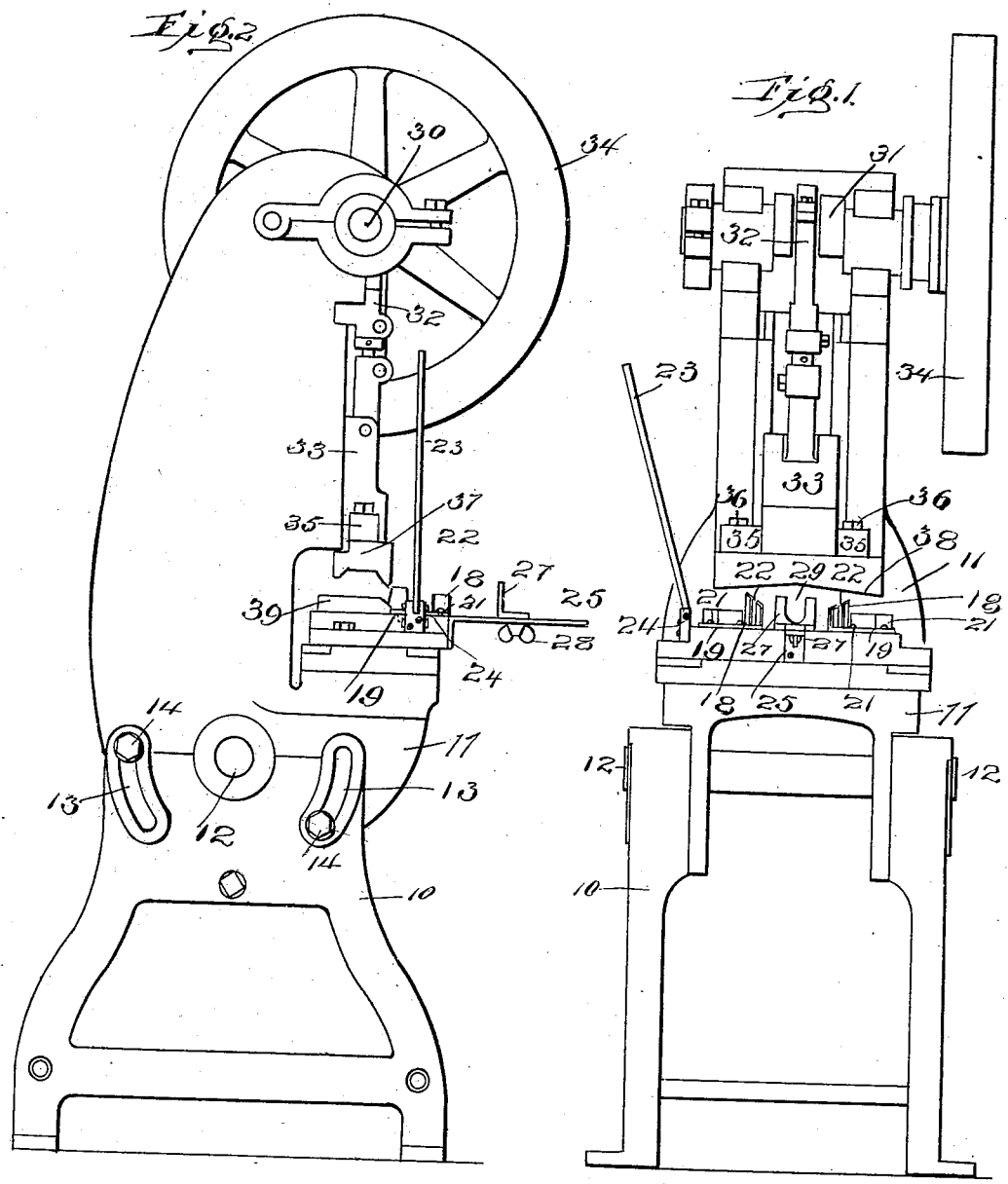

UNITED STATES PATENT OFFICE.

CHARLES PLUNKETT, OF NEW YORK, N. Y.

BROOM-TRIMMING MACHINE.

No. 862,754.     Specification of Letters Patent.     Patented Aug. 6, 1907.

Application filed March 23, 1907. Serial No. 364,037.

*To all whom it may concern:*

Be it known that I, CHARLES PLUNKETT, a citizen of the United States, residing at New York, in the county of New York and State of New York, have invented certain new and useful Improvements in Broom-Trimming Machines; and I do hereby declare the following to be a full, clear, and exact description of the invention, such as will enable others skilled in the art to which it appertains to make and use the same.

This invention relates to broom trimming machines, and has for an object to provide a machine of the class embodying improved features of convenience, economy and accuracy.

A further object of the invention is to provide in a broom trimming machine, means to regulate the length of the trimmed corn, and means to clamp the broom in position for being operated upon by the trimming element.

A further object of the invention is to provide in a broom trimming machine a reciprocating cutter curved upwardly from opposite ends and operated in conjunction with a fixed cutter.

A further object of the invention is to provide in a broom trimming machine a cutting table having a fixed cutting curve forming a part of the bed and with adjustable guides positioned to engage the opposite sides of a properly positioned broom.

With these and other objects in view, the invention comprises certain novel constructions, combinations and arrangements of parts, as will be hereinafter fully described and claimed.

In the drawings:—Figure 1 is a view of the improved broom trimming machine in front elevation. Fig. 2 is a view of the improved broom trimming machine in side elevation. Fig. 3 is a top plan view of the cutting table showing the reciprocating knife and the pitman rod in section. Fig. 4 is a vertical, sectional view through the opposed cutting elements.

Like characters of reference designate corresponding parts throughout the several views.

The broom trimming machine forming the subject-matter of this application comprises a frame or supporting structure 10 of any approved form here shown as spaced legs and carrying a body portion 11 hinged as at 12 for angular adjustment and with slots 13 engaged by clamping bolts 14 to maintain the body portion at the secured adjustment.

Upon the body portion 12 is mounted a knife 15 having a curved edge as shown particularly in Fig. 3 and rigidly secured upon the body in any approved manner as by means of the screw 16 and with its sharp or cutting edge disposed over an opening 17 by which material cut upon the cutting edge is discharged from the machine.

Upon the table formed partially of the knife 15 are mounted adjustable guides 18 by means of plate-like portions 19 provided with slots, as 20, and with binding screws 21 inserted through the said slots 20 and adapted to clamp the guides 18 in position. The edges of the plate-like portions 19 of the guides are preferably curved to conform substantially with the curved edge of the cutter 15 and the slots 20 may be formed as shown particularly in Fig. 3 so that as the guides are moved adjustably the curved edge of the guides will coincide substantially with the curved edge of the cutter 15.

The upstanding flanges of the guides 18 are provided with slots or notches 22, and a clamping lever 23 is pivoted as at 24 upon the body and proportioned and adapted to be swung upon the pivot to occupy the notches 22 in the guides 18 and to clamp a broom disposed between the said guides firmly upon the table. To the table is also secured a bracket 25 having in its horizontal limb a slot 26, and with a keeper 27 slidably mounted therein and adapted to be clamped in any approved adjusted position, as by the winged nut 28. The keeper 27 is provided with a slot 29 proportioned to permit the introduction therein of the handle of a broom, but of such size as to prevent the body of the broom or the shoulder formed by the corn upon the handle to pass therethrough and by the adjusting of the keeper 27 the length of the corn is determined.

Upon the body 11 is mounted a shaft 30 having a crank 31, engaging a pitman rod 32 which said pitman rod 32 in turn pivotally engages the sliding head block 33 and by the application of power to the shaft 31 in any approved manner, as by the pulley 34, a reciprocatory movement of the head block 33 is provided.

The head block 33 is provided with off-sets 35 through which extend bolts 36 engaging and rigidly securing a cutter 37 having an edge 38 curved to conform both to the curvature of the cutter 15 and curved upwardly from opposite ends, as shown more particularly in Figs. 3 and 1 respectively.

The object for the upward curving of the cutting edge 38 from the ends toward the middle is to prevent the spreading of the broom corn being operated upon when the knife 37 descends. About the table are arranged guides 39 by which the reciprocating knife 37 is accurately positioned.

In operation a broom is disposed between the guides 18 which have been previously adjusted to conform to the size of the broom being operated upon and with the handle of the broom disposed within the slot 29 of the keeper 27 and the uneven and untrimmed ends of the corn extending beyond the cutting edge of the cutter 15. The clamping lever 23 is then angularly moved upon its fulcrum to occupy a position within the slots 22 and upon the upper surface of the broom whereupon the mechanism is actuated and the knife 37 caused to descend to engage the overhanging ends of the corn and by reason of the engagement of the edge 38 with the cutting edge of the cutter 15, such overhanging ends are clipped and the clipped ends discharge through the opening 17. When the reciprocating cutter 37 has been returned to its upper limit the clamping lever 23 is returned to the position shown in Figs. 1, 2 and 3, and the broom removed clipped from the guides and keeper.

What I claim is:—

1. In a broom clipping machine, a frame, a shaft mounted to rotate on the frame, a table comprising a cutting edge carried upon the frame, guides mounted and movable upon the table, a keeper disposed to engage and position a broom, and a cutter mounted to reciprocate upon the frame and to receive motion from the shaft and adapted to co-act with the cutting edge of the table.

2. In a broom clipping machine, a frame, a shaft mounted to rotate on the frame, a table mounted upon the frame and comprising a curved cutting edge, reversely inclined guides adjustably secured upon the table, a keeper adjustably connected with the table and proportioned to engage and position a broom, a clamp removably positioned and proportioned to clamp a broom firmly upon the table, a cutter mounted to reciprocate, and having a curved edge adapted to co-act with the curved edge of the table, and means connecting the shaft and cutter whereby rotation of the shaft reciprocates the cutter.

3. In a broom clipping machine, an upright frame, a shaft mounted to rotate upon the frame, a cutter mounted to reciprocate vertically upon the frame and to be actuated by the shaft, a curved cutting edge mounted upon the frame and positioned for operation in association with the cutter, guides mounted and movable upon the frame, and means to maintain a broom in operative position.

In testimony whereof I affix my signature in presence of two witnesses.

CHARLES PLUNKETT.

Witnesses:
MICHAEL McCARTHY,
A. R. WIGGINS.